United States Patent [19]
Scott et al.

[11] Patent Number: 5,954,985
[45] Date of Patent: Sep. 21, 1999

[54] MATCHING APPARATUS FOR CONNECTING HIGH FREQUENCY SOLID STATE ELECTRICAL POWER

[75] Inventors: Paul Scott, Farmington; Michael Turzhitsky, Orange; Thomas Lee, Madison; Wallace C. Rudd, New Canaan, all of Conn.

[73] Assignee: Thermatool Corp., Conn.

[21] Appl. No.: 08/896,229

[22] Filed: Jul. 17, 1997

Related U.S. Application Data

[62] Division of application No. 08/569,988, Dec. 8, 1995.

[51] Int. Cl.⁶ ........................................ H05B 6/36
[52] U.S. Cl. .................. 219/666; 219/670; 219/672; 334/74; 336/10; 336/130
[58] Field of Search ..................... 219/608, 666, 219/670, 672, 674, 676; 334/71, 73, 74, 77; 336/130, 132, 136, 10

[56] References Cited

U.S. PATENT DOCUMENTS

| | | | |
|---|---|---|---|
| 2,551,756 | 5/1951 | Mittelmann | 219/666 |
| 2,715,171 | 8/1955 | Williamson | 219/672 |
| 2,856,499 | 10/1958 | Stanton et al. | 219/632 |
| 3,109,909 | 11/1963 | McBrien | 219/671 |

FOREIGN PATENT DOCUMENTS

| | | | |
|---|---|---|---|
| 613322 | 11/1948 | United Kingdom | 219/672 |
| 2146186 | 4/1985 | United Kingdom | 219/666 |

*Primary Examiner*—Philip H. Leung
*Attorney, Agent, or Firm*—Norris Mc Laughlin & Marcus; L. P. Brooks

[57] ABSTRACT

High frequency reactors for interconnecting a high frequency electrical power source and a load which reactors include a pair of plates having opposite surfaces with a length and width and a thickness between the surfaces which is small relative to the length and width of the surfaces. The plates are disposed with opposing closely spaced surfaces insulated from each other, and each of the plates has longitudinally aligned first and second portions with one portion of one of the plates electrically insulated from another portion of the plates and conductively interconnected by a variable reactance with another portion of the plates.

8 Claims, 8 Drawing Sheets

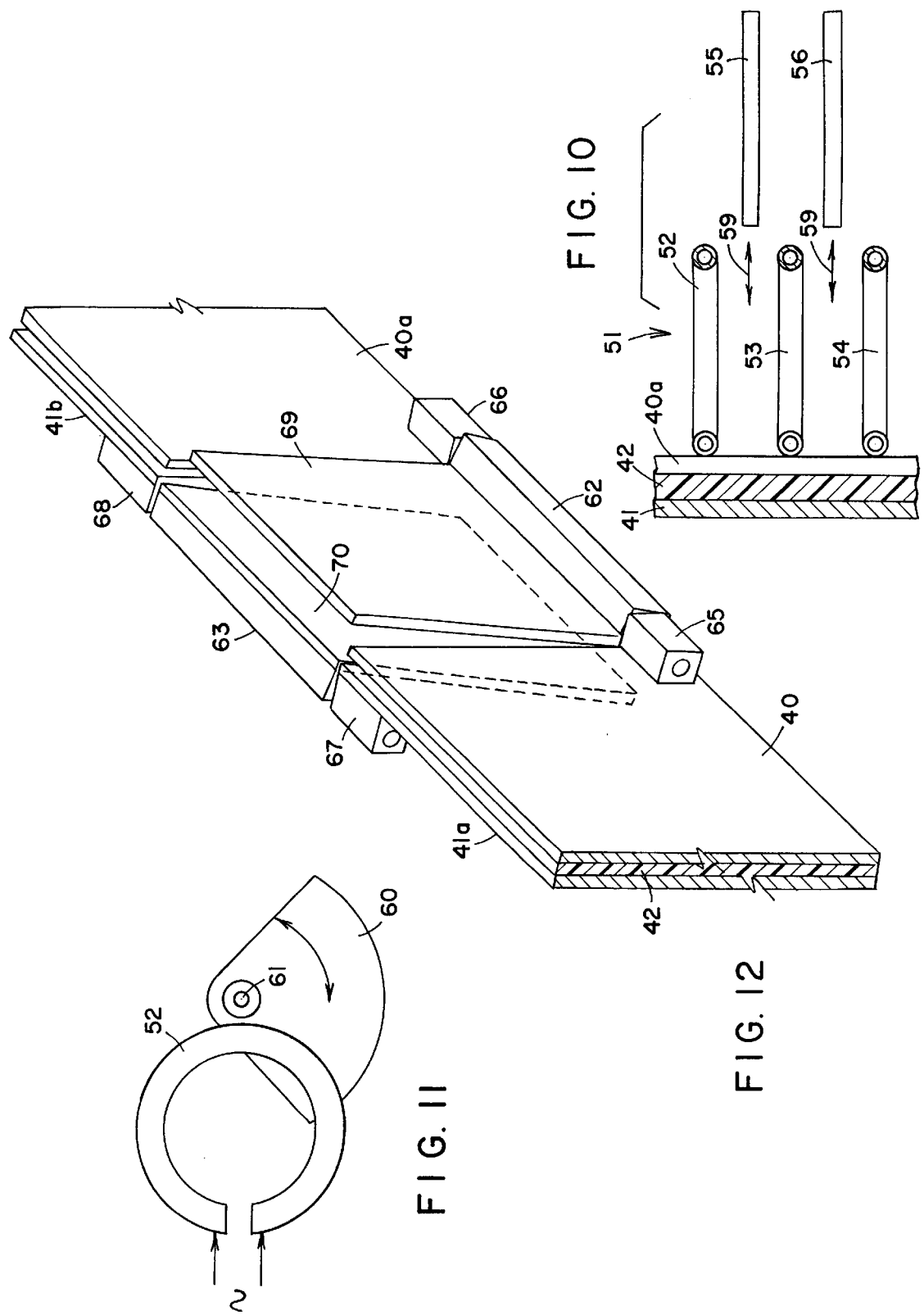

MATCHING APPARATUS FOR CONNECTING HIGH FREQUENCY SOLID STATE ELECTRICAL POWER

This application is a division, of application Ser. No. 08/569,988, filed Dec. 8, 1995.

FIELD OF THE INVENTION

This invention relates to the heating of portions of metal parts which are advanced as they are heated using high frequency current, i.e. 3 KHz or higher, for the annealing of previously welded portion and 100 KHz or higher for forge welding in which portions of metal parts to be welded together are heated to forge welding temperature and in which the high frequency current is supplied by a D.C. to A.C. inverter using solid state components to provide the high frequency currents.

BACKGROUND OF THE INVENTION

The forge welding together of metal parts, such as plates, fins to tubes, etc., or edge portions of the same part folded so that the edge portions meet at a weld point as such latter part is advanced longitudinally of the part, e.g. when a metal sheet or strip is folded into a tube and the strip is advanced in the direction of the axis of the tube, using high frequency, electrical currents to heat the portions to be welded together, is well known in the art. See, for example, U.S. Pat. Nos. 2,774,857; 3,037,105 and 4,197,441.

In general, the metal parts, or portions of a metal part, to be welded together are heated at the portions to be joined by the high frequency electrical current to forge welding temperature, which normally is at least 1300° F. and can be 2500° F.–2700° F. for steel but which is below the melting temperature of the metal and when the portions to be joined reach the forge welding temperature, they are pressed together to produce a weld between such portions.

The heating current is caused to flow in opposite directions on the opposing faces of the metal portions to be joined or welded together to take advantage of the "proximity effect" which causes the oppositely flowing currents to be increased at the faces as compared to current flowing more remotely from the faces. High frequency currents are used to take advantage of the well-known "skin effect".

In forge welding, the heating current is caused to flow in the portions to be heated to welding temperature either by contacts engaging the parts or by an induction coil which induces the current in the parts. In annealing, the heating current usually is induced in the parts by an induction coil and the temperature for annealing normally is at least 1300° F. and can be in the range from 140° F.–1500° F. for steel but is below the melting temperature and forge welding temperature of the metal. In the past, the high frequency current sources used have included vacuum tube oscillators. Due to the magnitude of heating currents involved, i.e. thousands of amperes, the vacuum tubes are large and expensive.

Relatively high power solid state, electron devices have been developed relatively recently which can be used in high frequency, electrical power sources to generate the necessary heating currents without the use of vacuum tubes. Such solid state, high frequency generators have certain advantages over vacuum tube oscillators, such as size, lower operating voltage and better theoretical electrical efficiency. For example, the solid state devices are smaller than the required vacuum tubes so that the overall size of the housing of the source can be smaller. To produce the large currents required, the vacuum tubes must be supplied with high voltage power, e.g. thousands of volts, whereas the solid state devices need electrical power at only hundreds of volts.

In addition, the theoretical maximum electrical efficiency, i.e. ratio of the high frequency power output to the low frequency or direct current power required to produce the high frequency power, is about 65% for a vacuum tube oscillator and about 80% for a solid state, high frequency power generator. Electrical efficiency is important in many cases, e.g. when the electrical power supplied to a plant by a utility company is expensive or when it is desired to increase the welding current magnitude used in an existing welding apparatus for various reasons but the utility lines, transformers, etc. must be modified or replaced to supply the additional current required. Accordingly, by replacing a vacuum tube oscillator, which is only part of the welding apparatus investment, by a solid state, high frequency generator, it is possible not only to improve the electrical efficiency and hence, the cost of welding but also to increase the welding currents without increasing the demand on the utility company equipment.

Accordingly, it is apparent that if a solid state, high frequency generator can be used in place of a high frequency generator using vacuum tubes, several advantages result.

One type of solid state high frequency generator is a direct current to alternating current inverter. See, for example, the article entitled "A Comparison of Load Commutated Inverter System for Induction Heating and Melting Applications" appearing in IEEE Transactions on Power Electronics, Vol. 6, No. 3, July 1991 which discloses a current source, parallel tuned inverter and a voltage source, series tuned inverter system, both of which use thyristors, for an induction melting furnace for the melting of metals. As with all generators, the maximum transfer of power from the generator to a load is obtained when the impedance of the load matches the impedance of the generator.

Additionally, because the load commutates the inverter, or causes the inverter to switch, the load must be a resonant circuit tuned at the frequency of the alternating output current. A solid state, high frequency generator has a low impedance compared to the impedance of a generator using vacuum tubes. Because of the load and vacuum tube generator impedances and the voltages involved, a special step-down transformer usually is required with vacuum tube generators to couple the generator to the load. See, for example, U.S. Pat. No. 2,825,033. A generator "load" is, of course, all electrical equipment connected to the output terminals of the generator. In welding and annealing apparatus of the type described, the load impedance is affected by many factors including the nature, size and shape of the parts being welded or annealed, whether an induction coil or contacts are used, connecting lead lengths and impedance, movement of the parts, etc. As a result, the load impedance is difficult, if not impossible, to predict, and historically, when the generator employs vacuum tubes, variable mutual inductance high frequency transformers or high frequency transformers with multiple primary taps between the load and the oscillator to scale the load impedance to the proper value have been used. Other methods employed have been the addition or removal of tank capacitors or the use of tapped inductors with manually adjustable shorting bars. All approaches but the variable mutual inductance transformer suffer from the fact that the load match can only be adjusted at low or no power output, so that an "on-line" or continually optimizing load match system was not possible with these approaches.

A solid state, high frequency generator of the D.C. to A.C. type is relatively sensitive in frequency generated with load impedance changes as compared to the frequency sensitivity of prior art vacuum tube, high frequency generators. In said article, the high frequency energy producing components are isolated from the load by a fixed ratio step-down transformer and the metal to be heated is substantially stationary. With a solid state, high frequency generator, if the load resonant frequency varies, the frequency of the generator output power varies. The load impedance, which is dependent on frequency, also varies and can change the load impedance and generator impedance relationship. Thus, a change in load impedance can cause mismatches in frequency and impedance, both of which are undesirable. While the same type of tapped or variable mutual inductance transformers used in vacuum tube welders may be used with some, most notably voltage fed, inverters, other inverter types, most notably current fed inverters, do not perform well when connected to a transformer. Tapped transformers suffer from their inability to adjust the load impedance at significant power levels while the generator is operating.

While said article describes some of the problems encountered with a melting furnace, it fails to recognize the problems the heating of a moving part or parts such as with forge welding apparatus or annealing apparatus connected to an inverter and operating frequencies of 3 KHz and higher which are needed for annealing and for forge welding. The article proposes the use of a fixed ratio matching transformer which is unsatisfactory for forge welding and annealing apparatus in which the parts move and does not disclose apparatus for automatically compensating for load variations as the heating of the moving parts is continuously produced.

Therefore, it is not a matter of merely substituting a solid state, high frequency generator for a vacuum tube high frequency generator. Instead, special provisions must be made for the control of the load impedance and frequency.

U.S. Pat. Nos. 2,856,499 and 3,145,285 disclose variable reactors for varying the current in a welding load. At the time of the applications for the patents (Feb. 28, 1957 and Jun. 19, 1963), high frequency generators of a sufficient power output for forge welding purposes and using solid state devices were not available, but vacuum tube high frequency generators were, and the inventors were referring at that time to generators other than solid state, high frequency generators as the high frequency source. Such other generators are not affected by load impedance changes in the same manner as solid state, high frequency generators, and the variable reactors were used merely to provide heating current changes and not to provide impedance matching and to overcome frequency shift problems encountered with solid state, high frequency generators.

As pointed out hereinbefore, the heating currents are of a large magnitude, i.e. thousands of amperes, and any series reactor must be able to conduct such currents without overheating. For these reasons, it is necessary that the series reactor have unique features when the heating currents are large.

BRIEF SUMMARY OF THE INVENTION

The apparatus of the invention comprises a variable reactor in series between the solid state high frequency generator output and the load and a variable reactor in parallel with the generator output, neither reactor having contacts for adjustment of reactance, for continuously adjusting the impedance match of the load to the generator and the heating current frequency at any power level, thereby eliminating the need for an adjustable high frequency transformer.

The reactors form part of a resonant tuned network including fixed capacitors incorporated in the leads to the load, i.e. the contacts or induction coil and the parts being heated, for load matching and frequency control.

BRIEF DESCRIPTION OF THE DRAWINGS

The invention will be better understood with reference to the following description of preferred embodiments which should be considered in connection with the accompanying drawings in which:

FIGS. 9 and 10 are schematic plan and side views of an alternate embodiment of the reactor shown in FIGS. 7 and 8;

FIG. 11 is a schematic plan view of a modification of the apparatus shown in FIGS. 9 and 10;

FIG. 12 is a perspective view of an alternate form of a variable reactor in which a conductive element is adjacent and movable with respect to a high reactance lead interconnecting the reactor with the inverter and with the load;

The invention will be described in connection with the electrical inverters of the type described in said article in said IEEE Transactions of Power Electronics except that the thyristors disclosed therein are replaced by metal oxide semiconductor field effect transistors (MOSFETs) to avoid starting problems described in said article and in connection with the heating of a portion or portions of moving metal parts at a current frequency of at least 3 KHz. However, any solid state electrical inverter can be used in the invention.

Figure 1:
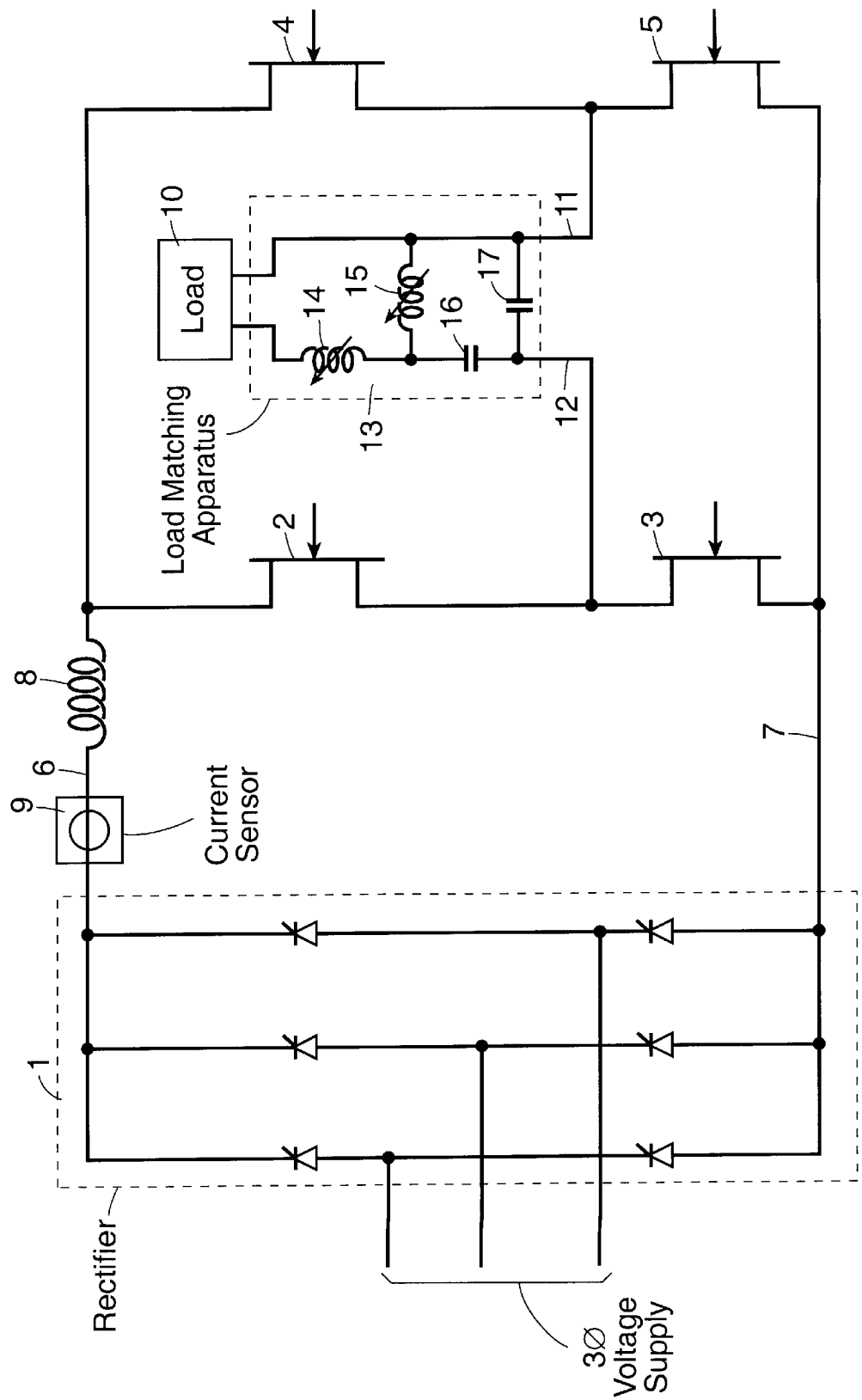
FIG. 1 is a schematic diagram of a first embodiment of the invention in which the solid state generator is a current source inverter system.
Figure 2:
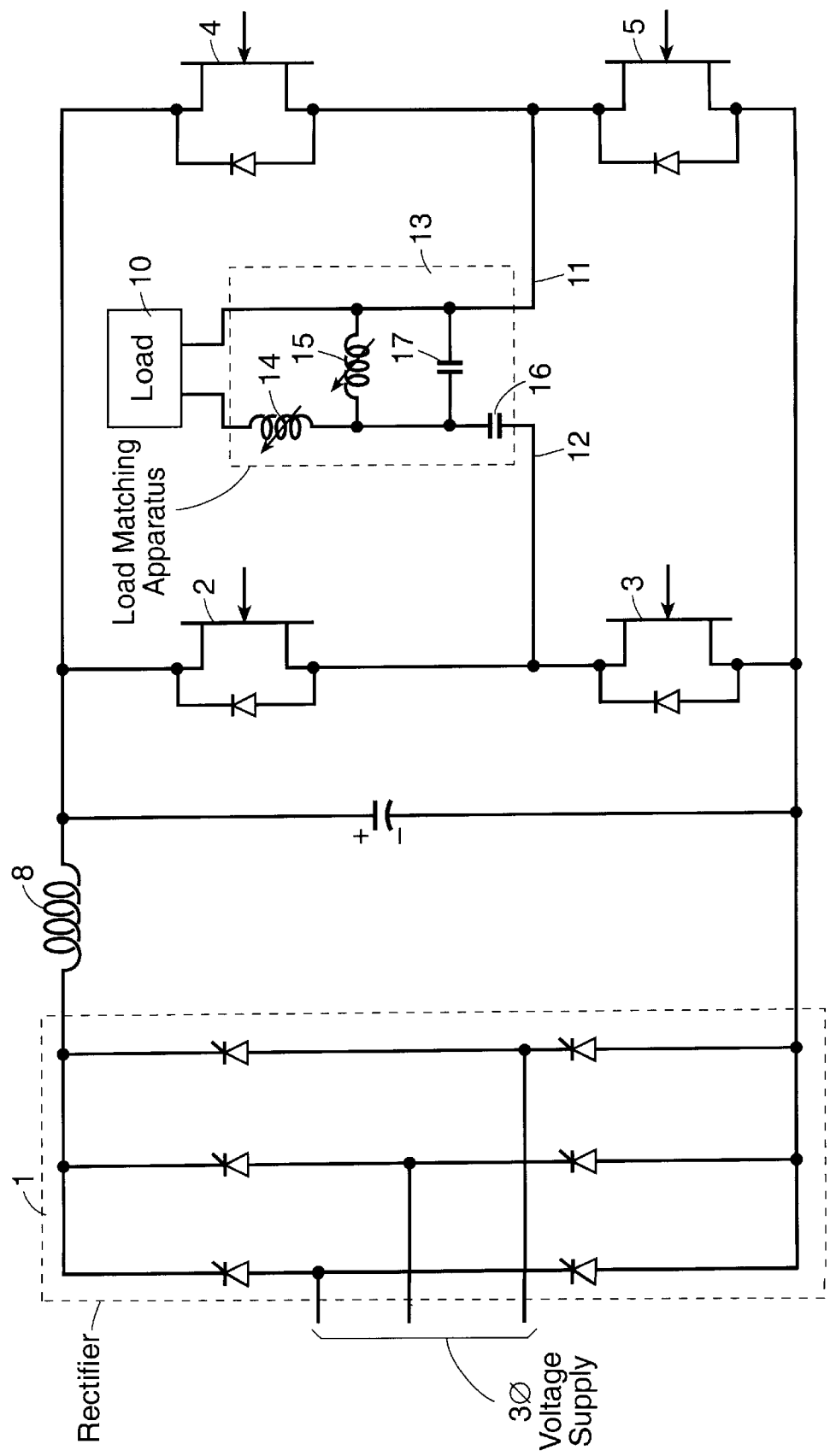
FIG. 2 is a schematic diagram of an embodiment of the invention in which the solid state generator is a voltage source series tuned inverter system.

FIG. 1 is a schematic diagram of the current source inverter shown in FIG. 2 of said article modified to replace the thyristors by MOSFETs and to include the load matching apparatus of the invention. In FIG. 1, a conventional rectifier 1 which converts three phase alternating current to direct current is connected to the inverter circuits comprising the MOSFETs 2, 3, 4 and 5 through leads 6 and 7 and a fixed inductor 8. A conventional current sensor 9 which provides an output proportional to the current supplied to the inverter and hence, to the load 10 or heating current supply apparatus, such as contacts engaging the moving part or parts or an induction coil inducing heating currents in such parts, is associated with the lead 6.

The operation of the inverter is conventional and known to those skilled in the art and has output leads 11 and 12 connected to the load 10 by load matching apparatus 13 which comprises a first variable reactor 14 electrically in series between the inverter output and the load 10, a second variable reactor 15 electrically connected in parallel with the inverter output, a first high frequency, low loss capacitor 16 electrically connected in series between the inverter output and the load 10 and a second high frequency low loss capacitor 17 electrically connected in parallel with the inverter output. Optionally, the capacitor 16 can be omitted but is preferred.

At the frequencies involved, the load includes leads and an induction coil or contacts contacting a pipe having inductance and resistance and the load has a significant inductance and resistance. Such load, the reactors 14 and 15 and the capacitors 16 and 17 form a tank circuit connected to the inverter output. As is known, the impedance of a tank circuit at resonance is equal to the resistance of the tank circuit. Selection of the values for the capacitors 16 and 17 and the ranges for the two variable reactors 14 and 15 proceeds from determining the nominal load inductance value, which is the sum of the nominal load inductance with a tube being heated and, if used, any magnetic core within the tube and the ancillary bus work inductance, the range of load resistances to be matched to the welder, and the welding frequency. Also required to complete the design is knowledge of the value of resistive impedance into which the inverter can deliver its full power. With this knowledge, the value Cp of the capacitor 17 is calculated to be that value necessary to support the highest circulating current produced by the tank circuit at full power output. This can be shown to be:

$$Cp = (1/(2 \times pi \times f)) \times (1/(Ro \times Rmin)^{1/2})$$

where:

pi is 3.1415926, f is the desired welding frequency,

Ro is the resistive impedance required by the inverter to deliver its full power output, and Rmin is the minimum resistive impedance expected at the work coil terminals.

Knowing Cp, the value Cs of the capacitor 16 is calculated to cause the tank circuit to resonate at the welding frequency:

$$Cs = Cp/(Cp \times Lnom \times (2 \times pi \times f)^2 - 1)$$

where:

Lnom is the nominal load inductance.

With the values chosen above, the circuit shown in FIG. 1 will provide the correct resistive impedance to the inverter so it can provide its full power output when the work coil exhibits its nominal inductance and minimum resistance, and when the inductance of the two variable reactors 14 and 15, can be neglected, i.e. the Lp of reactor 15 is essentially infinite and the Ls of the reactor 14 has essentially zero inductance.

To match higher values of work coil resistance, the variable reactor 14 must be adjusted to achieve the current necessary to dissipate the same power as was achieved in the minimum load resistance case. This can be accomplished by increasing the reactance value of reactor 14, recognizing that the voltage across the reactor 15 is constant at full power output if the load is matched. Because the load reactance is much higher than the resistance (high Q load), a good approximation is that:

$$Ls\ max = (Rmax/Rmin)^{1/2} - 1) \times Lnom$$

where:

Ls max is the required maximum design value for the variable reactor 14, and:

Rmax is the maximum load resistance expected at the terminals of the load current supplying device.

However, as Ls is increased to match larger load resistances, the inductance of the tank circuit increases, its resonant frequency drops, and thus, the weld frequency is reduced. To maintain the welding frequency at its desired value, the reactance Lp of the variable reactor 15 is reduced so that the effective inductance of the circuit is always equal to Lnom:

$$Lp\ min = Lnom \times (Lnom + Ls\ max)\ Ls\ max$$

Thus two variable reactors are needed, one adjustable in reactance from Lp min to a large value, and one adjustable from a small value of inductance to Ls max. These reactors are designed in a way that the values of their reactance can be adjusted when the inverter is delivering full power.

As an example, let it be assumed that the reactors 14 and 15 are of the type shown in U.S. Pat. No. 2,856,499 which are adjustable in reactance by the core shown therein which is partly magnetic and partly conductive and non-magnetic.

The reactor 15 is designed to have an inductance without a core equal to the required minimum value, Lp min. The core for the reactor 15 coil contains sufficient magnetic material, e.g. ferrite to make the coil inductance at least 5 times Lnom when the slug is inserted fully in the coil. The conductive part of the core can be omitted. The core for the reactor 14 contains ferrite at one end and copper at the other when the copper portion of the core is inserted in the coil, it will have its minimum value of reactance determined by the clearance between the copper core and the inside of the coil. It is possible to design this clearance to obtain a minimum value of reactance for reactor 14 less than 10 of Lnom. Positioning the core to its other extreme places the ferrite inside the coil. The coil is designed to have an inductance of Ls max under this condition. The reactors are physically integrated with the lead set connecting the inverter to the work coil as described hereinafter.

It is simple matter to adjust the positions of the cores in the reactors to match the load resistance to the inverter at the designed weld frequency. This can be done by manually positioning the cores, or they can be motorized and adjusted either manually or automatically. When the inverter is first started with a new coil and/or load, the cores are initially positioned so that both inductors exhibit their maximum value (the core for the reactor 15 fully in and the core for the reactor 14 fully to the ferrite side). This provides the highest Q load to the inverter and tunes it to the lowest frequency achievable by the load matching network. The relative values of inverter voltage and current are observed and the core in reactor 14 is slowly repositioned so that the inverter is supplying the same proportion of their maximum values of voltage and current at the desired operating power level. The core is withdrawn from the reactor 15 to obtain the desired operating frequency. This can be done coincident with the adjustment of the core of reactor 14 or subsequent to it. If the cores are adjusted sequentially, it may be necessary to readjust the core for reactor 14 after adjusting the core for the reactor 15 and then readjusting the core for the reactor 15 after adjusting the core for the reactor 14. Generally, one iteration of sufficient to achieve an acceptable load resistance match at the designed weld frequency.

FIG. 2 illustrates schematically a voltage source series tuned inverter connected to a load by load matching apparatus 15. Corresponding elements in FIG. 2 are designated by the reference numerals used in FIG. 1. A filtering capacitor 18 has been added and the position of the capacitor 16 relative to the other elements have been changed. Optionally, the capacitor 17 can be omitted.

The selection of the values for the components 14–17 is accomplished essentially as described in connection with FIG. 1 and will be readily apparent to those skilled in the art. Also, the reactors 14 and 15 are adjusted as described in connection with FIG. 1, the objective being to make the load matching apparatus 13 connected to the load 10 resonant at the desired operating frequency.

Figure 4:
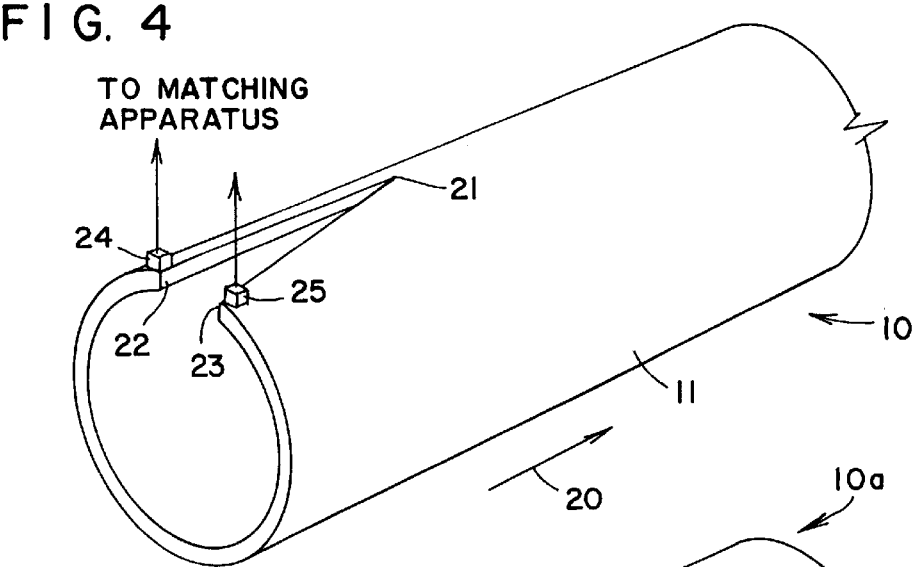
FIGS. 4 and 5 are schematic perspective views illustrating, respectively, a forge welding load using contacts to supply and using an induction coil to induce, the heating current at edge portions of a metal strip being folded to form a tube.

FIG. 4 illustrates schematically and in perspective a known type of load 10 in the form of a metal tube 19 formed by folding a metal plate or sheet as it is advanced in the direction of the arrow to a forge weld point 21, the high frequency current being supplied to the edge portions 22 and 23 by contacts 24 and 25 engaging the edge portions 22 and 23 in advance of the weld point.

Figure 5:
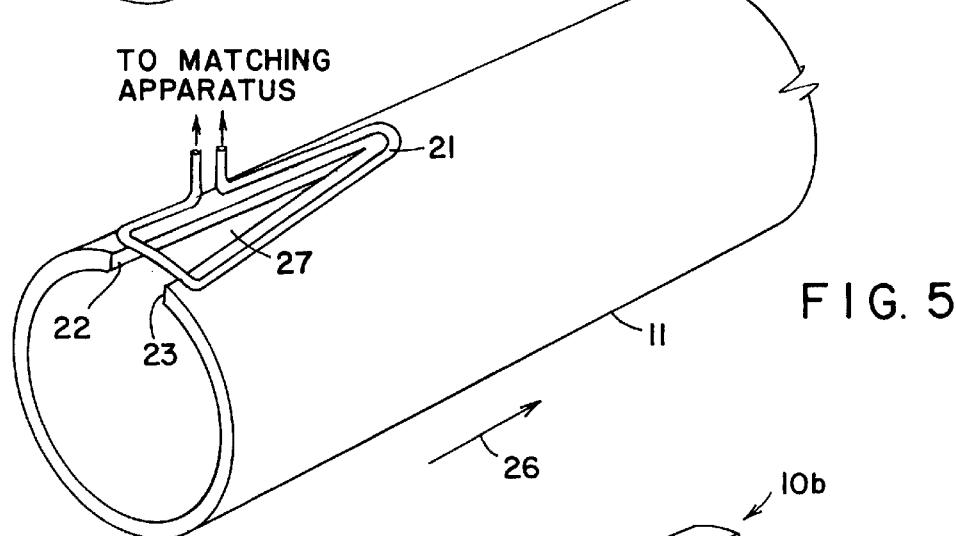

FIG. 5 illustrates schematically and in perspective a load 10a in which currents are induced in the edge portions 22 and 23 of a metal tube 11, as it is advanced in the direction of the arrow 26, by an induction coil 27 spaced from the tube 11. Other types of induction coils, such as a coil encircling the tube 11, and in both the loads 10 and 10a, a magnetic member, known as an "impeder" can be disposed within the tube 11 in advance of the weld point 21.

Figure 6:
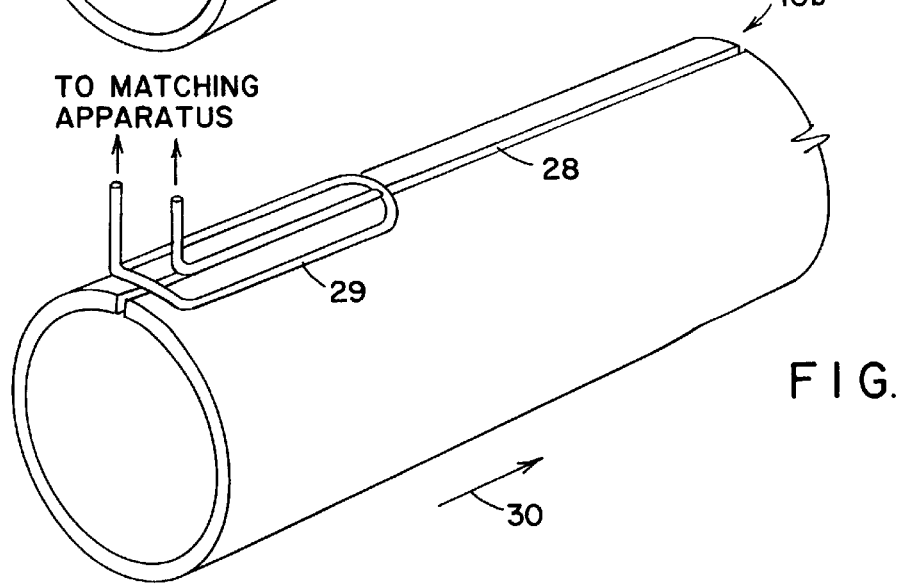
FIG. 6 is a schematic perspective view illustrating an annealing apparatus load for annealing the metal at the seam of a welded tube using an induction coil.

FIG. 6 illustrates schematically and in perspective a load 10b in which a previously welded tube 12 have a welded seam 28, such as a tube formed with the apparatus of FIG. 4 or FIG. 5 is heated at the seam 28 by high frequency current induced at the seam 28 by an induction coil 29 spaced from the tube 12, as the tube 12 is advanced in the direction of the arrow 30, for annealing purposes.

As pointed out hereinbefore, the leads connecting the load current supplying means, such as the contacts 24 and 25 or the induction coils 27 or 29, have inductive reactance and resistance, the contacts 24 and 25 have resistance and the coils 27 and 29 having inductive reactance and resistance. In the system of FIG. 4, the tube 11 presents inductive reactance and resistance at the contacts 24 and 25, and in the systems of FIGS. 5 and 6 the reactance of the coils 27 and 29 is affected by the material of the tubes 11 or 12, which can vary along its length, and by the spacing between the coils and the tubes. Thus, as the tubes 11 or 12 are advanced, the impedance presented to the output of the load matching apparatus normally varies, and it is necessary to compensate for the variations to maintain a heating current of substantially constant magnitude and frequency.

Figure 3:
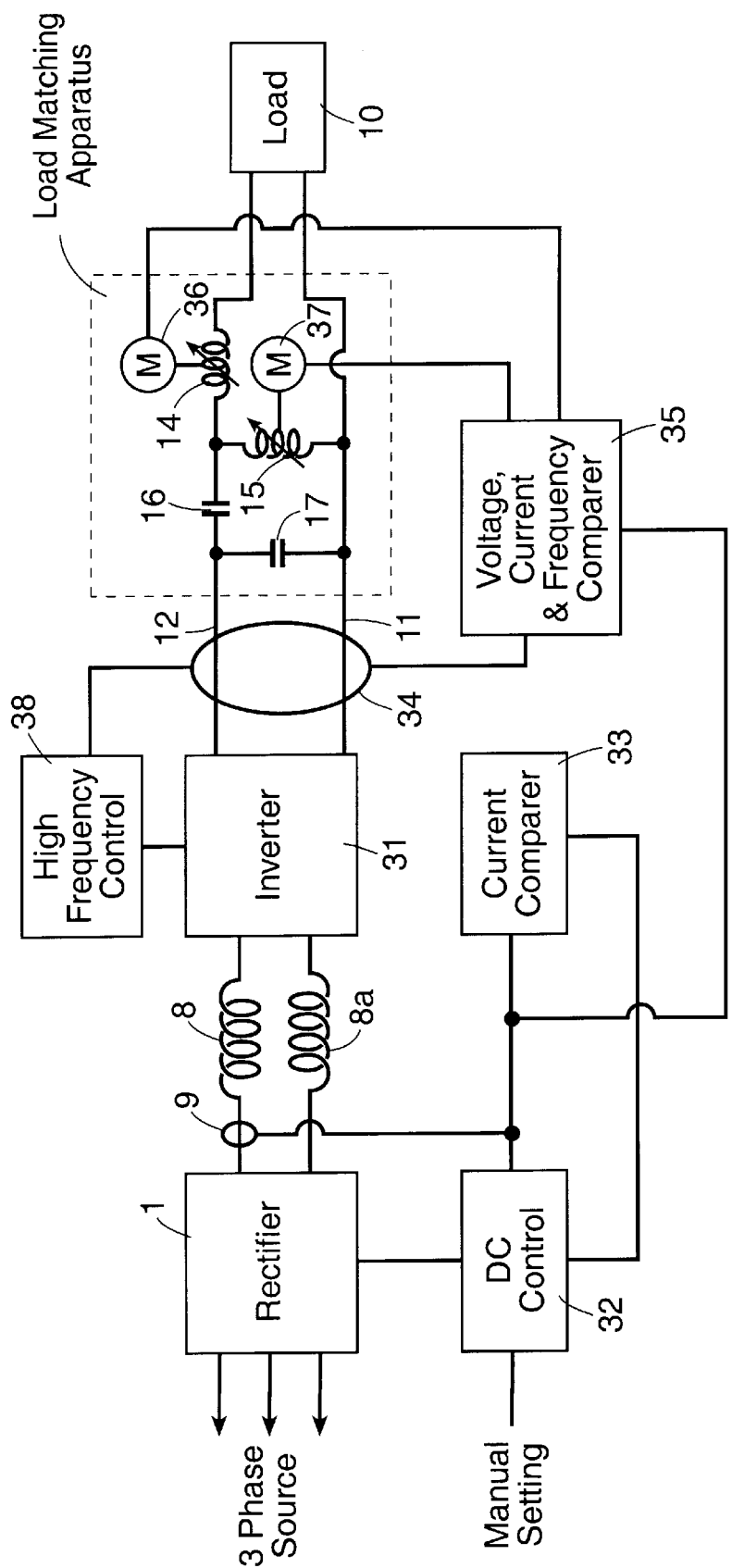
FIG. 3 is a combined block and schematic diagram of apparatus for automatic control of the load matching apparatus used in the invention.

FIG. 3 is a schematic diagram of automatic control apparatus which can be used with the apparatus shown in FIG. 1 to control the impedance presented to the inverter 31 at its output leads 11 and 12 and hence, the frequency and magnitude of the current supplied by the inverter 31.

Although not shown in FIGS. 1 and 2, the rectifier 1 normally has a control 32 for controlling the d.c. voltage output of the rectifier 1. The nominal level of the rectifier output can, as indicated, be set manually. Output current from the sensor 9 is supplied to a current comparer 33 of a known type, and the output of the comparer 33 is supplied to the control 32 to insure that the maximum current level is not exceeded.

The output of the sensor 9 and the output of a further sensor 34, the latter sensor providing information as to the voltage and frequency of the power at the leads 11 and 12, are supplied to a known type of comparer 35 which compares the measured voltage, current and frequency with predetermined values of voltage, current and frequency and acts as load matching control for maintaining the desired load impedance and inverter frequency at the output of the inverter 31. The comparer 35 provides an electrical output which actuates a motor 36 for varying the reactance control element for the reactor 14 and an electrical output which actuates a motor 37 for varying the reactance control for the reactor 15.

The output of the sensor 34 is also supplied to a high frequency control 38 of a conventional type which controls and synchronizes the firing of the MOSFETs 2–5 in a conventional manner.

In a preferred embodiment of the invention, every 90 seconds the comparer 35:

(1) Measures the voltage and current and if the resulting ratio of the ratio of the measured voltage to the maximum voltage to the ratio of the measured current to the maximum current is greater than 1.05, the output of the comparer 35 causes the motor 36 to operate so as to decrease the reactance of the reactor 14. If the resulting ratio is less than 0.95, the comparer output causes the motor 36 to operate so as to increase the reactance of the reactor 14; and (2) Compares the measured frequency with the desired frequency, and if the ratio of the measured frequency to the desired frequency is greater than 1.05, the output of the comparer 35 causes the motor 37 to operate so as to increase the reactance of the reactor 15. If the ratio is less than 0.95, the output of the comparator 35 causes the motor 37 to operate so as to reduce the reactance of the reactor 15.

Of course, the intervals of measurement can be greater or less than 90 seconds and the levels at which adjustments of the reactors 14 and 15 are made can be different depending on the permissible variations of load matching desired.

From the foregoing, it is apparent that the load matching control or comparer 35 in conjunction with the variable reactors 14 and 15 control the impedance presented to the inverter 31 at the leads 11 and 12. Thus, the reactor 15 controls the frequency at which the inverter 31 operates, and the reactor 14 controls the reactance in series with the load 10 so that in conjunction with the reactor 15, the impedance presented to the inverter 31 at the output leads 11 and 12 is equal or substantially equal to the impedance of the inverter 31 thereby causing the supply of electrical power at the leads 11 and 12 to be a maximum. By using relatively low loss capacitors 16 and 17, relatively low loss reactors 14 and 15 and relatively low loss leads between the leads 11 and 12 and the load 10, maximum power will also be supplied to the load 10.

While low loss capacitors are commercially available, it is a problem to provide low loss reactors without adjusting contacts and which not only can carry large currents involved but also have relatively low losses and the necessary range of reactance adjustability.

Since the current frequency is relatively high, e.g. at least 3 KHz for annealing and at least 100 KHz for forge welding, the reactors can be coils of relatively few turns and the conductor forming the coils can have a relatively large cross-section to reduce the resistance of the coils. Also, as described hereinafter, reactors which are not helical coils can be used. In each case, whatever heating is incurred in the reactor can be dissipated by water, or other fluid, cooling which is conventional in the art.

Figure 7:
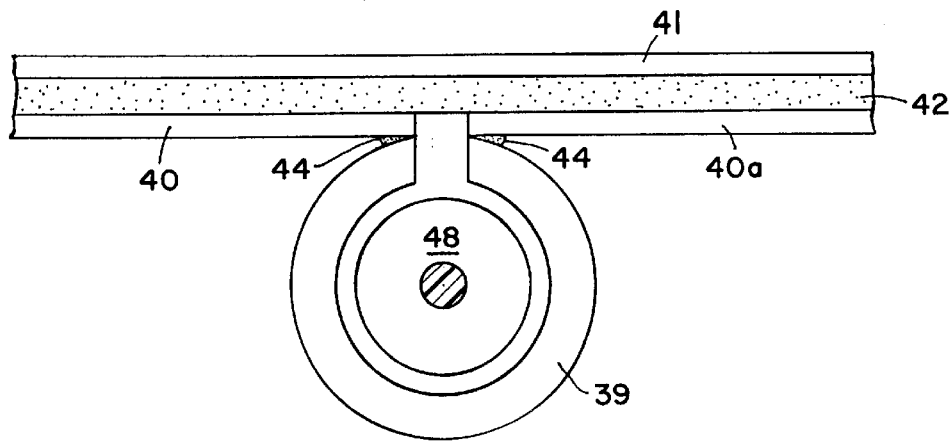
FIGS. 7 and 8 are schematic plan and side views illustrating the use of a variable reactor, variable by a conductive element and a magnetic element, in series between an inverter output and the load, the conductive element being omitted in FIG. 7 for ease in illustration and the leads being omitted in FIG. 8.
Figure 8:
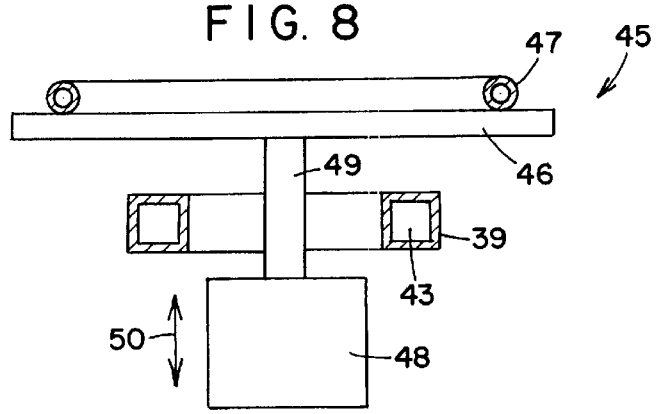

The leads used in large current, high frequency applications can be made of plates or sheets of copper of a relatively large cross-section in closely spaced relation and separated by insulation. FIGS. 7 and 8 illustrate in plan view and side view, respectively, with the leads omitted in FIG. 8, a single turn reactor 39 connected in series with such leads 40 and 40a which are in closely spaced relation to such a lead 41 and separated from the leads 41 by high frequency insulation 42. The reactor 39 can have more than one turn and can be formed by copper tubing, e.g. of square cross-section as shown in FIG. 8, cooling fluid such as water being caused to flow through the bore 43 thereof.

For example, reactor 39 can be the series reactor 14 with the lead 41 forming a continuation of the lead 11 (FIGS. 1–3), the lead 40 electrically connecting with the capacitor 16 and the lead 40a electrically connected with one terminal of the load 10. Alternatively, if the reactor 39 is connected between the leads 40 and 41, the reactor 39 can be the parallel reactor 15.

Normally, with the large currents involved, the leads 40, 40a and 41 will be fluid cooled in a conventional manner, such as by tubing brazed to the leads through which cooling fluid flows.

The reactor 39 is conductively connected at its ends, such as by brazing metal 44, and is in electrical series with the leads 40 and 40a. When current flows from one lead to the other through the reactor 39, a magnetic energy field is produced adjacent the reactor which is variable by a conductor or a body of magnetic material adjacent to the reactor 39. Variation of the energy field varies the reactance of the reactor 39.

FIGS. 7 and 8 illustrate an energy field varying means comprising a conductive plate 46, such as a copper plate, with a tube 47 conductively connected thereto, such as by brazing for the flow of cooling fluid.

The plate 46 is connected to a cylindrical body 48, such as a water cooled plastic casing enclosing magnetic material, such as a ferrite material, by an insulating rod 49 so that the plate 46 and the body 48 move simultaneously, such as in the two directions indicated by the double ended arrow 50. Thus, when the assembly of the plate 46, body 48 and rod 49 move downwardly, the plate 46 approaches the reactor 39 and reduces its reactance and the body 48 recedes from the reactor 39 and also reduces its reactance. When the assembly moves in the opposite direction, the reactance of the reactor 39 increases. The use of the plate 46 as well as the body provides a relatively large reactance change, but if such change is not required, one or the other of the plate 46 and the body 48 can be omitted.

The assembly of the plate 36, the body 48 and the rod 49 can be driven by the motor 36 or the motor 37 (FIG. 3), the motor having a linear, reversible connection to the assembly.

Figure 9:
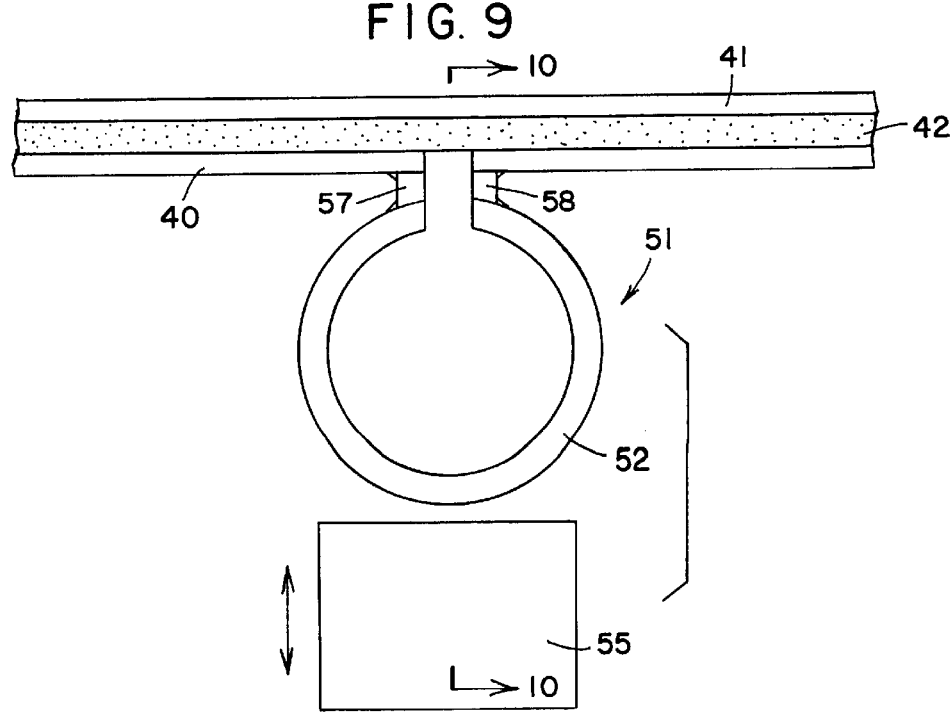

FIGS. 9 and 10 illustrate a modified form of a reactor which can be used for the reactors 14 and 15 and in place of the reactor 39. The reactor 51 shown in FIGS. 9 and 10 comprises a plurality of substantially single turns 52, 53 and 54 of copper tubing, through which cooling fluid can flow, connected in electrical parallel and variable in reactance by a pair of copper plates 55 and 56 which can be fluid cooled. The ends of the tubes 52–54 are conductively secured to a pair of conductive headers 57 and 58 which are conductively secured to the leads 40 and 40a, respectively. The plate 55 can be moved into and out of the space between the tubes 52 and 53 and the plate 56 can be moved into and out of the space between the tubes 53 and 54, as indicated by the double ended arrows 59, such as by the motor 36 or the motor 37, to vary the reactance of the tubes 52–54. Thus, as described in connection with the conductive plate 46, the plates 55 and 56 can vary the energy field around the tubes 52–54 and vary the reactance of the tubes 52–54.

Preferably, at least two tubes 52, 53 or 54 and at least one plate 55 or 56 is used but the tubes and plates can be greater in number than the number shown in FIGS. 9 and 10. Also the tubes 52–54 can be connected in electrical series rather than in electrical parallel.

To avoid the need for a linear motor drive for the plates 55 and 56, the plates 55 and 56 can be replaced by arcuate plates, such as the arcuate plate 60 shown in FIG. 11, which are rotatable around an axis 61 so that they can enter into, or be removed from, the spaces between the tubes 52 and 53 and 53 and 54.

A further embodiment of a variable reactor which can be used as the series reactor 14 is illustrated in FIG. 12. In this embodiment, both the lead 40 and 41 are interrupted to provide leads 41a and 41b and 40 and 40a, and they are interconnected by pivotable, water cooled, conductive bars 62 and 63 pivotally mounted at their ends in conductive bearings 65, 66, 67 and 68 conductively secured to the leads 40 and 41a and 41 and 41a as shown in FIG. 12. The bar 62 has a conductive plate 69 conductively secured at one end thereto, and the bar 63 has a conductive plate 70 conductively secured at one end thereto. Thus, as bars 62 and 63 are pivoted, such as by a motor or motors controlled by the comparer 35, the plates 69 and 70 move toward or away from each other. Preferably, the plates 69 and 70 are moved simultaneously either toward or away from each other. The plates 69 and 70 and the bars act as a pair of reactors, one between the leads 40 and 40a and one between the leads 41a and 41b, which are variable in reactance by the plates 69 and 70. When the plates 69 and 70 are relatively far apart, the reactance is relatively high, and when the plates 69 and 70 are closer together, the reactance is reduced.

The insulation 42 can extend between the plates 69 and 70 to prevent them from touching and short-circuiting the leads. Also, if a smaller reactance variation is acceptable, one of the plates 69 and 70 can be omitted, and in this case, the corresponding leads 40 and 40a or 41a and 41b would be uninterrupted and continuous.

Figure 13:
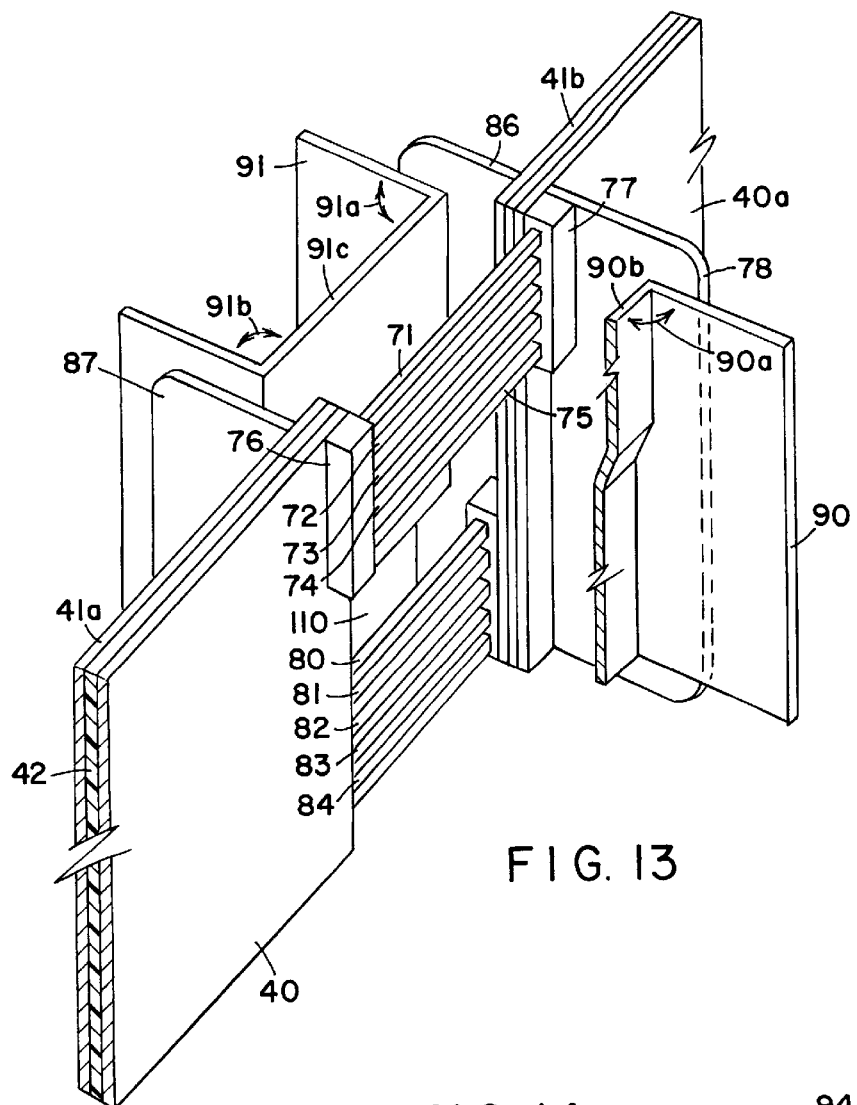
FIG. 13 is a perspective view of an alternate embodiment of a variable reactor in which a conductive element is insulated from a high reactance lead or leads.

FIG. 13 illustrates a modified form of the embodiment shown in FIG. 12 in which contact between the movable reactance varying elements and the leads is not required. In the embodiment illustrated in FIG. 13, the lead segments 40 and 41a are interconnected by a plurality of water cooled, conductive tubes 71–75 e.g. copper tubes, conductively secured at their ends to headers 76 and 77 conductively secured, respectively, to the lead 40 and the lead 40a. A conductive flap 78 is conductively secured to the header 77 and the lead 40a, and although not shown in FIG. 13, for ease in illustration, there is another corresponding flap 79

(see FIG. 14) conductively secured to the header 76 and the lead 40. Flaps 78 and 79 are used to reduce the losses and to reduce the reactance when the elements 90 and 91 are fully inserted.

Conductive tubes 80–84, similar to the tubes 71–75, similarly conductively interconnect the leads 41a and 41b and are conductively connected to headers, header 86 being shown in FIG. 13, conductively connected to the leads 41a and 41b. Flaps 86 and 87, similar to the flaps 78 and 79, are similarly conductively connected to the leads 41a and 41b.

The tubes 71–75 and the tubes 80–84 preferably, are rectangular in cross-section to reduce the reactance thereof. Also, the surface areas thereof nearest the leads 40 and 40a and 41a and 41b parallel to the planes of the leads is less than the width dimension of the leads so that there is a gap 110 between the tubes 71–75 and the tubes 80–84.

A pair of reactance varying conductive elements 90 and 91, U-shaped in cross-section, are, respectively, insertable into and removable from the space between the flaps 78 and 79 and the space between the flaps 86 and 87, without contact with the flaps, the tubes 71–75 and 80–84 or the leads 40–40a and 41a and 41b.

Although flaps 78, 79, 86 and 87 are shown as being at an angle of 90° with respect to the respective leads 40a, 40, 41b and 41a, the angle can be different, e.g. 45° with the spacing between corresponding portions of the flaps 78 and 79 and of the flaps 86 and 87 increasing with distance from the respective leads. In this case, the angles of the wings of the conductive element 90 and 91, e.g. angles 90a, 91a and 91b, with respect to the interconnecting portions 90b and 91c would be increased so that the wings of the elements 90 and 91 are substantially parallel to the adjacent flaps. With such alternative, the losses at any position of the elements 90 and 91 can be reduced, and the range of reactance variation can be increased without increasing the required movement of the elements 90 and 91.

Figure 14:
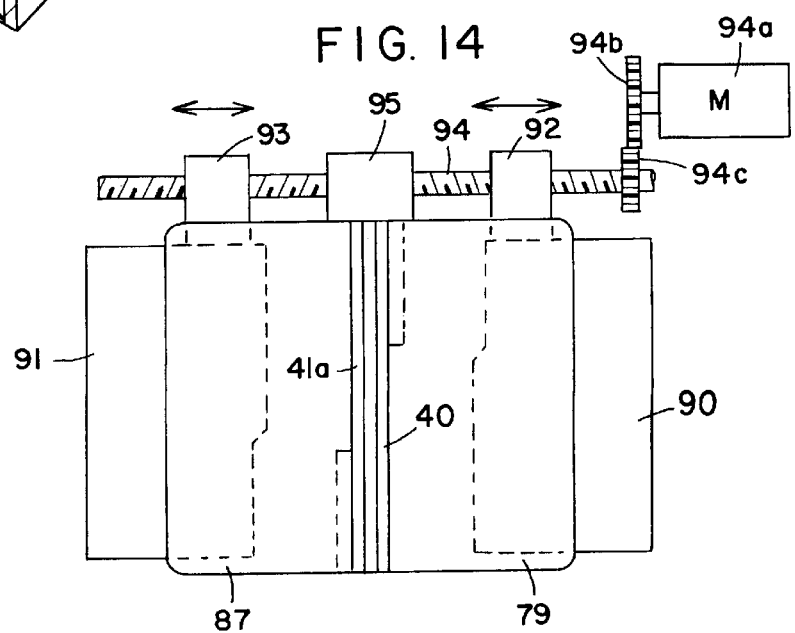
FIG. 14 is a schematic, end elevation view illustrating apparatus for moving the conductive, reactor reactance varying elements shown in FIG. 13.

FIG. 14 illustrates schematically a drive for the elements 90 and 91. The elements 90 and 91 are secured to nuts 92 and 93 which have opposite hand internal threads and which can be non-conductive. The nuts 92 and 93 receive a non-conductive rotatable threaded rod 94 which is supported by a non-conductive bearing 95 supported from the leads 40, 40a, 41a and 41b. At opposite sides of the bearing 95, the rod 94 has threads of opposite hand. Thus, when the rod 94 is rotated in one direction, such as by the motor 94a and the gears 94b and 94c, the elements 90 and 91 simultaneously move into the spaces between the flaps 78 and 79 and 86 and 87 and lower the reactance of the tubes 71–75 and 80–84. When the rod 94 rotates in the opposite direction, the elements 90 and 91 move in the opposite direction and the reactance of the tubes increases.

The embodiment shown in FIGS. 13 and 14 is useful primarily when the frequency of the heating current is at least 200 Khz. If a smaller range of reactance change is sufficient, one or the other of the combinations of flaps 78 and 79 and element 90 or flaps 86 and 87 and element 91 can be omitted. For example, if the element 91 is omitted, the flaps 86 and 87 can be omitted. Also, if desired, the tubes 71–75 and/or the tubes 80–84 can be replaced by other, water cooled conductive elements, such as water cooled copper plates having surface areas corresponding to said surface areas of the tubes 71–75 and/or the tubes 80–84 which are replaced.

Figure 15:
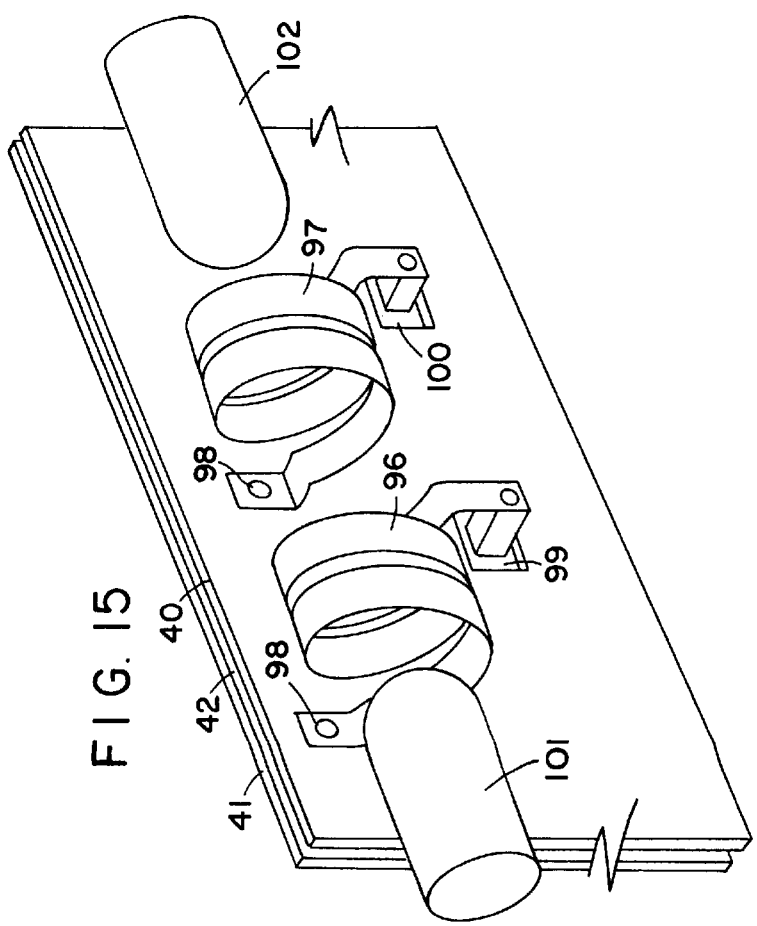
FIG. 15 is a schematic perspective view of a pair of conductive coils connected in parallel with the output of the inverter and variable in reactance by cores which are made of a magnetic material.

FIG. 15 illustrates a pair of approximately two turn coils 96 and 97 which can be used as the parallel reactor 15 shown in FIGS. 1–3. Each coil 96 and 97 is conductively connected to the lead 40 at 98, and the opposite ends of the coils 96 and 97 are conductively connected to the lead 41 through openings 99 and 100 in the lead 40. The reactance of the coils 96 and 97 is variable by the magnetic cores 101 and 102. Of course, if the range of reactance variation is sufficient, one of the coils 96 and 97 and its associated core 101 or 102 can be omitted.

Figure 16:
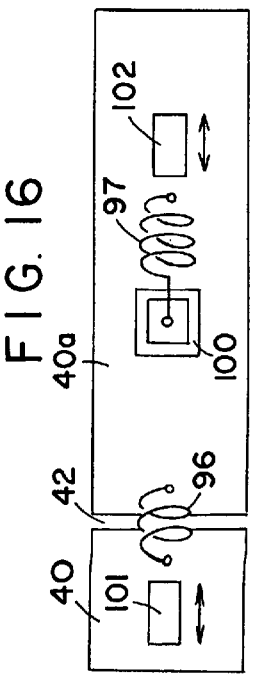
FIG. 16 is a schematic side view of reactors in series and in parallel with the inverter output and variable in reactance by cores of magnetic material.

FIG. 16 illustrates schematically a pair of the coils 96 and 97 conductively connected to the leads 40 and 40a, one in series and one in parallel with the leads 40a and 41. Thus, the reactor 96 corresponds to the reactor 14 in FIGS. 1–3 and the reactor 97 corresponds to the reactor 15 in FIGS. 1–3.

As is known, the impedance of parallel leads at high frequencies depends upon the spacing between the leads. The impedance increases as the leads are more widely separated and decreases with a decrease in spacing.

Figure 17:
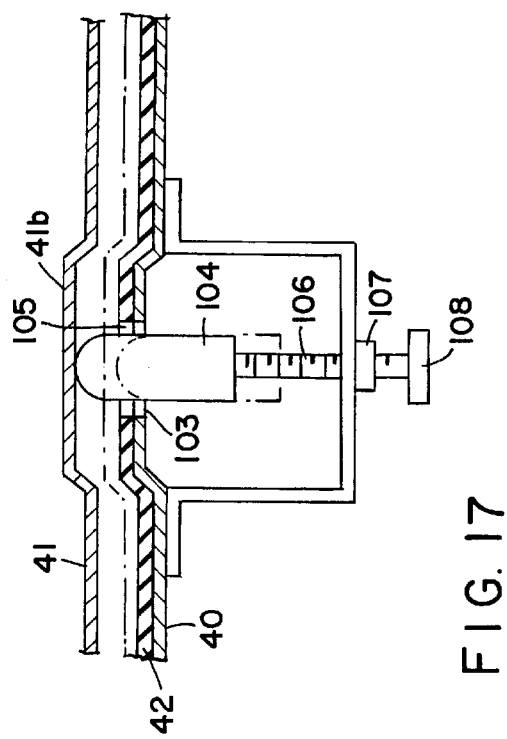
FIGS. 17 and 18 are plan and perspective views of a reactor comprising leads which can have a variable spacing to vary the reactance thereof.
Figure 18:
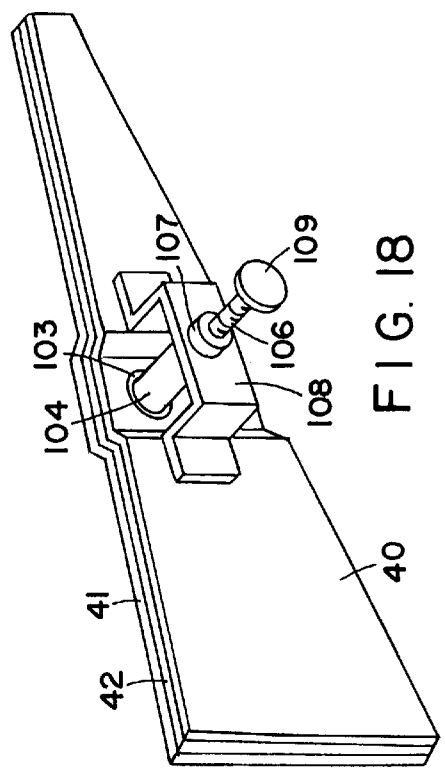

FIGS. 17 and 18 illustrate the use of variable spacing between portions of the leads 40 and 41 to provide a variable reactor. Although the leads 40 and 41 can be parallel at the portions where the reactance is variable, it would be necessary for the leads to move longitudinally at at least one of their ends to permit separation of the leads. This latter problem can be avoided by bending the leads 40 and 41 at the variable reactance portions 40b and 41b. As illustrated in FIGS. 17 and 18, the lead 40 has an opening 103 through which a plug or separating member 104 of electrical insulating material extends and the insulation 42 has a similar opening 105 through which the plug 104 extends into contact with the portion 41b.

The plug 104 is mounted on a threaded rod 106 which engages an internally threaded nut 107 secured to a bracket 108 secured to the lead 40. The rod 106 can be turned manually by the knob 109 or can be connected to a reversible motor, such as the motor 36 (FIG. 3), for separating the portions 40b and 41b. Normally, when the plug 104 is retracted, the portion 41b will spring back toward the portion 40b, but if desired or necessary, a spring engageable with the portion 41b can be used to cause the portion 41b to move toward the portion 40b when the plug 104 is retracted.

Although preferred embodiments of the present invention have been described and illustrated, it will be apparent to those skilled in the art that various modifications may be made without departing from the principles of the invention.

We claim:

1. A high frequency reactor comprising first, second and third conductive plates each of which has opposite surfaces with a length and a width and each of which has a thickness between said surfaces which is small relative to the length and width of said surfaces, said first and second plates being disposed with a said surface thereof in closely spaced, parallel and electrically insulated relation to a said surface of said third conductive plate, said first and second conductive plates being longitudinally aligned with a gap therebetween and said first and second conductive plates with said third conductive plate having predetermined reactances, interconnecting means at said gap having a reactance and conductively interconnecting said first and second conductive plates and a fourth conductive plate at said gap and movable toward and away from said third conductive plate for varying the reactance of said interconnecting means.

2. A reactor as set forth in claim 1 wherein said interconnecting means comprises a plurality of conductive members disposed in side-by-side relation and spaced from each other.

3. A reactor as set forth in claim 2 further comprising a first conductive flap conductively connected to said first conductive plate at one side of said gap and extending in the direction away from said third conductive plate, a second conductive flap conductively connected to said second conductive plate at the other side of said gap and extending in the direction away from said third conductive plate, said first flap being spaced from said second flap, and wherein said fourth conductive plate has wings which are substantially parallel to said flaps and extend in said direction from said fourth plate, said fourth conductive plate being without conductive contact with said first and second conductive plates.

4. A reactor as set forth in claim 1 wherein said interconnecting means comprises a plurality of conductive coils, each of at least one turn, disposed in side-by-side relation and spaced from each other, said fourth conductive plate being movable along a path intermediate a pair of said coils.

5. A high frequency reactor comprising first and second conductive plates having an input at one end for receiving high frequency electrical energy and an output at the opposite end for connection to a load, each of said plates having opposite surfaces with a length and a width and each plate having a thickness between said surfaces which is small relative to the length and the width of said surfaces, said plates being disposed with a said surface of said first plate in closely spaced, parallel and electrically insulated relation with a said surface of said second plate and a conductive coil of at least one turn conductively connected at one end to said first conductive plate and at its opposite end to said second conductive plate and a magnetic core movable within said coil for varying the reactance of said coil.

6. A high frequency reactor comprising first and second conductive plates having an input at one end for receiving high frequency electrical energy and an output at the opposite ends for connection to a load, each of said plates having opposite surfaces with a length and a width and each plate having a thickness between said surfaces which is small relative to the length and the width of said surfaces, said plates being disposed with a said surface of said first plate in closely spaced parallel and electrically insulated relation with a said surface of said second plate and one of said first and second conductive plates having two portions aligned in the length direction of said one plate and electrically insulated from each other and a conductive coil of at least one turn conductively interconnecting said portions and a magnetic core movable within said coil for varying the reactance of said coil.

7. A high frequency reactor comprising first and second conductive plates having an input at one end for receiving high frequency electrical energy and an output at the opposite end for connection to a load, each of said plates having opposite surfaces with a length and a width and each plate having a thickness between said surfaces which is small relative to the length and the width of said surfaces, said plates being disposed with a said surface of said first plate in closely spaced, parallel and electrically insulated relation with a said surface of said second plate, each of said plates having predetermined reactances, and each of said first and second conductive plates having a first portion and a second portion aligned in the length direction of the plate and one said portion of said second plate being electrically insulated from a said portion of one of said first and second plates, interconnecting means having a reactance and conductively connected to and interconnecting said one said portion of said second conductive plate with said portion of one of said first and second plates other than said one said portion of said second plate, and movable reactance varying means adjacent said interconnecting means for varying the reactance of said interconnecting means with movement of said reactance varying means.

8. A high frequency reactor comprising first and second conductive plates in closely spaced, parallel and electrically insulated relation to a third conductive plate, said first and second conductive plates being longitudinally aligned with a gap therebetween and said first and second conductive plates with said third conductive plates having predetermined reactances, interconnecting means at said gap having a reactance and conductively interconnecting said first and second conductive plates, said interconnecting means comprising a plurality of conductive members disposed in side-by-side relation and spaced from each other, a first conductive flap conductively connected to said first conductive plate at one side of said gap and extending in the direction away from said third conductive plate, a second conductive flap conductively connected to said second conductive plate at the other side of said gap and extending in the direction away from said third conductive plate, said first flap being spaced from said second flap, and a fourth conductive plate at said gap and movable toward and away from said third conductive plate for varying the reactance of said interconnecting means wherein said fourth conductive plate has wings which are substantially parallel to said flaps and extend in said direction from said fourth plate, said fourth conductive plate being without conductive contact with said first and second conductive plates.

\* \* \* \* \*